Patented May 23, 1950

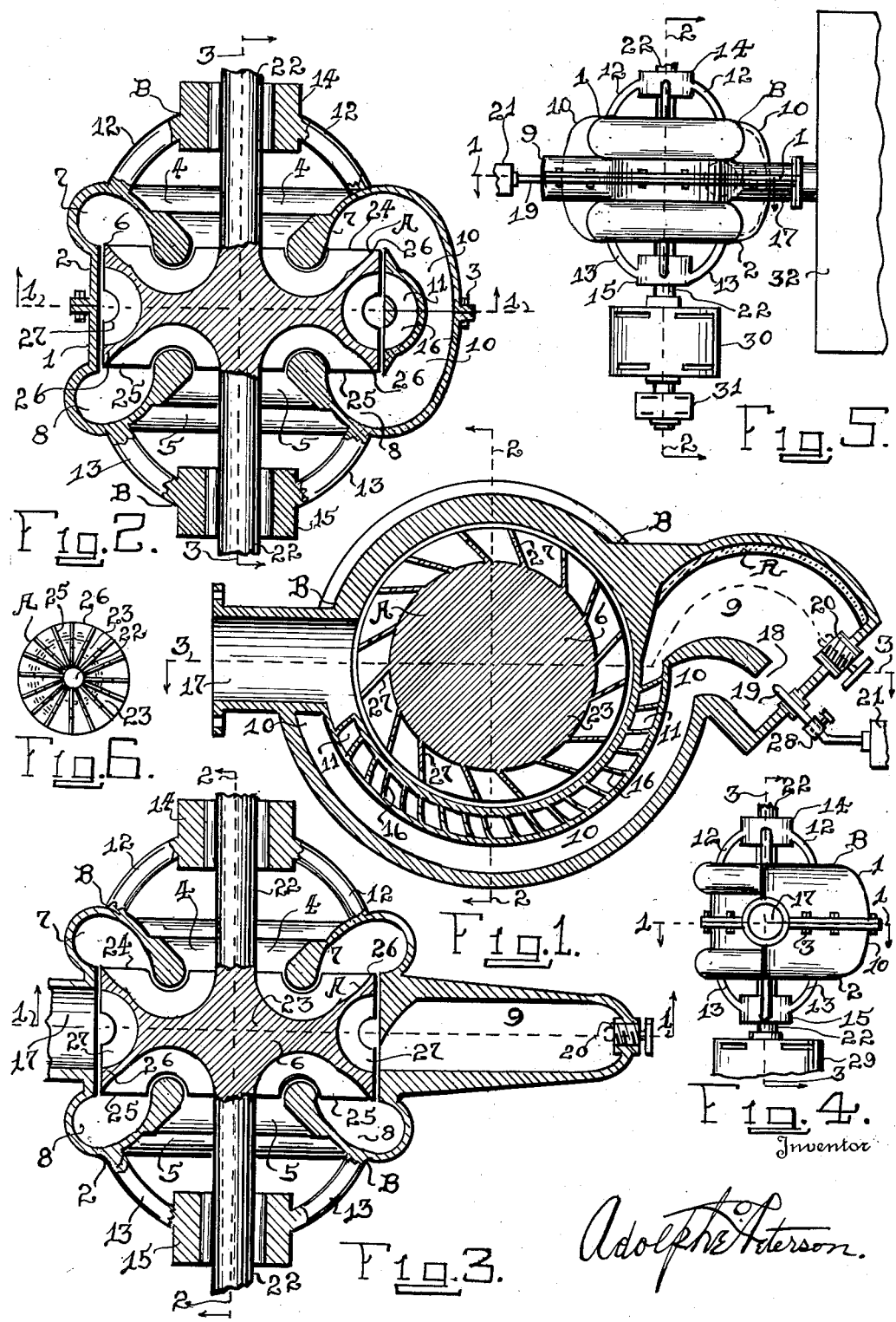

2,508,685

UNITED STATES PATENT OFFICE 2,508,685

COMBUSTION GAS TURBINE

Adolphe C. Peterson, Minneapolis, Minn.

Application September 12, 1944, Serial No. 553,698

5 Claims. (Cl. 60—41)

My invention relates to turbines and particularly to a form thereof which employs combustion gases for its motive fluid and it is therefore called combustion gas turbine means.

The chief objects of my invention are to provide a form of combustion turbine which shall be simple in design, relatively cheap in manufacture and which shall also be a reliable and durable form. A principal object is to provide a form of such a turbine which shall have the ability because of its method of using air and fuel to operate at a relatively very high temperature, even higher than such temperatures as may be employed in a turbine using special steel alloys, so that efficiency may accordingly be as high as the heat cycle will provide. A principal object is to provide a form of such a turbine as will be so compact and simple in its use of air and fuel for combustion that it may be used in any design where an especially high speed may be used. An object is to provide a turbine which by reason of its ability to use high temperature gases and its corresponding efficiency may be useful in any plant or transport means where especially great power as compared with its weight is desirable or especially great power as compared with its cubical size or content is desirable. It is contemplated that this turbine means may be useful and desirable in any air-borne flight means, in transport means carried on water or on land, and also that it may be used to provide power for electric generation for any use, especially in conjunction with use of the exhaust gases for other power generation or heating provision as for buildings.

The principal devices and combinations of devices comprising my invention are as hereinafter described and as defined in the claims. In the accompanying drawing which illustrates my invention, like characters refer to like parts throughout the several views.

Referring to the drawing:

Figure 1 is a view in section transversely of the longitudinal axis of the turbine means, that is at right angles to that axis, and is on a plane on the lines 1—1 of Figures 2, 3, 4 and 5.

Figure 2 is a section at right angles to that of Figure 1 and on a plane on the line 2—2 of Figure 1, Fig. 3 and Fig. 5.

Figure 3 is a section at right angles to that of Figure 1 and on the line 3—3 of Figure 1, this line being a line or plane deviating from the flat plane as it passes through the primary combustion chamber, that is away from the turbine wheel, and also on line 3—3 of Figs. 2 and 4.

Figure 4 is a view in much reduced scale in full side elevation as the device is viewed from the front in Figure 2, this view showing also the turbine shaft connected to or having formed on an end a generator armature which may be capable of being used as a starting motor and as a generator after the shaft is in rotation.

Figure 5 is a view in much reduced scale in full side elevation as the device is viewed from the front in Figure 3, this view showing also the turbine shaft connected to or having formed on an end both an electric generator which may be an alternating current generator and an electric starting motor, and showing also the use of the device for generating current and at the same time for heating with its exhaust gases a boiler or furnace device which may be used for auxiliary power generation or for building heating.

Fig. 6 is a view in reduced scale of the turbine wheel or unit A as this unit A would be seen looking from the lower end of shaft 22 as the shaft 22 is stationed in Figures 2 and 3.

Referring first to Figures 1, 2, 3, which show in enlarged scale the device in detail, internally, the rotor unit is here designated generally by the letter A and the casing is in general designated by the letter B. The casing B is in general formed in two parts which may be bolted together or otherwise joined together to enclose the unit A, and the parts of the casing are designated 1, and 2, and the bolts as 3. Each part 1 and 2 is substantially a counterpart of the other and each may be made of any suitable metal, preferably steel or an alloy thereof. The parts 1 and 2 may be cast, forged or otherwise formed. The parts 1 and 2, when united, form between them a cylindrical chamber or space wherein the unit A is rotatable and form air intake parts of generally annular form about the axis of unit A, one 4 on one side of wheel 6, and another 5 on the opposite side of wheel 6; and form also air accumulating or blower discharge port-conduits 7 and 8, of a general annular form about the axis of unit A, one on each side of wheel 6; and form also a primary combustion chamber 9 peripherally of the wheel chamber; and form also a jacket space 10 joined with the discharge port-conduits 7 and 8; and form also immediately adjacent the wheel space and peripherally thereof, internally of jacket space 10, the reaction chamber 11.

The parts 1 and 2 form also or have secured with them by means of integrally cast or otherwise secured brackets 12 on one side and 13 on the other side, a pair of bearings 14 and 15, respectively, one on one side of wheel 6 and the other on the other side of wheel 6. The air intake port-conduits 4 and 5 are open to the atmosphere as they receive air, respectively, through the spaces between the brackets 12, as to one, and the brackets 13, as to the other. The parts 4 and 5 form conduits to conduct air from atmosphere, or from any connected means in an annular stream to the spaces on each side of wheel 6 and immediately adjacent the axis of the rotor unit.

The reaction chamber 11 formed by the adjacent portions of the casing parts 1 and 2 is so located that it curves peripherally around the periphery of wheel 6 throughout a portion of that periphery which is shown as approximately fifty per centum thereof but which may be as nearly one hundred per centum as the design will permit or may be somewhat less than as shown. The reaction chamber 11 has vanes 16 formed by the metal of parts 1 and 2 or welded thereto. These vanes are each substantially one-half of a plane circle or one half of a disk in form. Each is inclined somewhat tangentially to the periphery of wheel 6 and may be inclined to the plane of axis of unit A somewhat. Each should be relatively parallel to its adjacent vanes. The reaction vanes 16 form substantially one-half of a space through which gases pass in performing work, the other half being formed by the immediately adjacent portion of the wheel 6, as the latter revolves. The reaction chamber 11, which is the space formed by the passages between vanes 16, is open at one end to and receives gases from the combustion chamber 9, and at its opposite end is open to and discharges to the discharge conduit 17 which is formed by the adjacent metal of parts 1 and 2, and which delivers combustion gases after their work on the wheel 6 is performed, tangentially or at right angles away from the wheel 6, either directly to atmosphere or by way of any connected conducting agency or means to atmosphere.

The combustion chamber 9 is closed on all sides from the atmosphere, and has discharge only to and by way of the reaction chamber 11. There is entry and delivery thereto only by way of a passage 18 of small cross section which delivers to chamber 9 from the adjacent end or portion of the jacket space 10, and by way of the latter from the blower discharge port-conduits 7 and 8. There is also delivered fuel thereto which is discharged under pressure through a fuel nozzle 19, the fuel discharge being directed into the passage 18 so that as fuel is sprayed into passage 18 it will be very thoroughly commingled with air passing through passage 18 and carried by such air into the combustion chamber 9. The combustion chamber 9 is no larger than is necessary to provide for thorough mixing and rapid combustion or initial combustion of the air and fuel as it passes through chamber 9, but it should on the other hand be so formed and of such broad cross section and capacity that the velocity of gases is not so great at the point of entry into chamber 9, as to prevent ignition, although it is contemplated that because of the thorough admixture of the fuel with the air in passage 18 and the combustible nature of the fuel to be used, and the degree of heat and pressure, there will be always immediate ignition of the mixture as it enters chamber 9 and substantially immediate combustion. The ignition is primarily accomplished by means of the spark plug 20 which may be served with current for sparking by any supply means, such means not being shown as it may be any means, supplying a continuous or intermittent stream of sparks. The ignition means 20 may be any incandescent element instead or any pilot gas or fuel jet may instead be used and any means provided for its ignition.

The fuel nozzle 19 is any type of fuel spraying nozzle which will adequately and thoroughly spray fuel as it is delivered to the nozzle by any supply means such as a fuel pressure reservoir or fuel pump means 21. The latter is diagrammatically shown only, and may be supplied or operated by any means not shown, as an electric motor or any power means. The fuel nozzle will preferably be supplied with either a gaseous fuel as natural or artificial gas or with a liquid fuel as kerosene or gasoline or any petroleum fuel or alcohol fuel or any flowing fuel as air-borne or liquid borne pulverized coal or fuel of solid character. The means shown is contemplated to diagrammatically illustrate any such form of continuously delivered or flowing form of fuel which may be delivered in a stream and in measured quantity as it is used, into passage 18 for admixture with the air delivered therethrough.

The foregoing generally describes the casing B and there is now described in detail the rotor unit A. The rotor unit A may be a unit cast or forged of steel or steel alloy in one piece and machined as necessary or it may be formed of such sections as may be necessary and desirable, the sections being then welded together or otherwise secured together. Preferably it is formed of one integrally cast or forged piece or ingot. Its main element is a shaft 22 which is of such size and weight that it is strong and very rigid, and with this shaft there is formed transversely thereof at about the center of its length, a turbine wheel 6 which generally comprises a centrally disposed disk 23, compressor blades 24 formed integrally on one side of disk 23, compressor blades 25 formed integrally with it on the other side of disk 23, and an integrally formed rim element 26. The latter has formed within its pair of circumferential sides a plurality of substantially semi-circularly shaped transverse blades or vanes 27. All of these sections of the turbine wheel 6 are preferably cast or forged integrally with the shaft 22 and disk 23 so that it is all one unit of steel or alloy and has therefore greater strength and lighter weight in proportion to strength. It is contemplated that the parts of unit A may be formed or machined in as many sections as is convenient for manufacture and that the sections may be secured together or welded together in any manner so that they will be one unit and operate as such.

The rim element 26 with its vanes 27 disposed equi-distantly about its periphery within its side elements forms substantially a semi-circularly shaped space about the periphery of wheel 6 this space being broken by the transversely placed vanes 27 at equi-distant points about the wheel 6. Thus this spacse formed peripherally about wheel 6 forms a radially depressed passage between the sides of rim 26 which when placed in its location as shown in casing B, forms with the reaction chamber of casing B and vanes 16 a passage around the periphery of wheel unit 6 adjacent reaction chamber 11 which is substantially circular in cross section at any radius of wheel 6. This circular passage, so formed, between wheel unit 6 and casing B, is a substantially continuous passage interrupted by the vanes from the combustion chamber 9 to the discharge conduit 17, so that gaseous fluid passing through this passage so formed circulates in a circuitous path between the wheel unit and reaction chamber 11 and the moving fluid will therefore have a path which is somewhat similar to a cork screw path, and movement of such fluid will constitute a reaction between wheel unit 6 and its vanes and the vanes of reaction chamber 11, to thereby create propulsive thrust between the vanes 16 and vanes 27 and thereby procure impulse on wheel 6 and its shaft 22.

This cork screw like passage of fluid through the passage described is similar to the reaction motivation in steam turbines such as the Terry steam turbine which is now well known. Its general action in propulsive motivation of wheel unit 6 will therefore be readily understood. The vanes of unit 6 and the counter-part vanes of reaction chamber 11 may have a slight inclination to the radii from axis of unit 6. It is contemplated that the entry from combustion chamber 9 to the reaction passage which has been described will be at one side of this passage so that the fluid will flow into the wheel passage at its periphery at one side and pass circularly in the space between a pair of vanes of unit 6 and have egress at the other side, passing upwardly to the reaction chamber where the fluid will enter the opposite side of reaction chamber 11 and pass between another pair of vanes 16 and discharge again to the wheel unit 6 at the first named side and reenter the passage of the wheel unit between its vanes, and this succession will continue until the discharge conduit 17 is reached where the fluid will pass at right angles away from the wheel unit.

It will be seen by reference to the drawings that the compressor blades 24 and 25 on opposite sides of disk 23 form a somewhat circular passage between each adjacent pair of compressor blades on a side of disk 23 so that air from atmosphere entering the annular induction conduits 4—5 will flow into the passages between the compressor blades on either side of disk 23 centrally of disk 23 and will then flow in a circular path radially outwardly until the free discharge to the annular discharge conduits 7—8 is reached so that the air is thus by the compressor blades 24 and 25 given a centrifugal thrust action which will compress the air as it flows to the annular discharge conduits 7—8 and the air thus compressed will accumulate under pressure in the said discharge conduit and flow under such compression radially outwardly at the side locations adjacent the reaction chamber 11 and into the air cooling jacket externally of reaction chamber 11 and thereby to passage 18 and thence to combustion chamber 9. As disclosed in the drawings the wheel unit 6 with its compressor blades 24—25 and its turbine wheel vanes 27 and their adjacent rim 26 is so formed that the compressor blades are very closely adjacent to the turbine wheel vanes 27 and that the flow of cold air in compression is very close to vanes 27 and immediately adjacent to the adjacent rim 26 and the disk 23 bearing the vanes 27 so that the metal of all these elements being integral or very closely united forms a direct and continuous path for heat flow between the vanes 27 and compressor blades 24—25, so that there is thus sufficient conduction between the vanes 27 and their rim 26 which bears vanes 27, and compressor blades 24—25, that the vanes 27 cannot unduly heat in action. There is thus provided an efficient cooling of the turbine wheel unit 6 and its vanes 27 and their bearing rim 26, so that these elements cannot over-heat even though the temperature of the gases in the reaction chamber 1 and within vanes 27 of wheel unit 6 is at the maximum available for efficient combustion and efficient heat utilization in the expansion and creation of velocity of the flow of gases in the passage of combustion gases through reaction chamber 11 and the reaction passage for impulse on wheel unit 6.

Having described the device in detail its general operation is now described. It will be noted that the fuel pump or pressure reservoir 21 will supply the liquid or fluid fuel at any pressure suitable, and this pressure should be at least such as will secure an efficient atomization or segregation and dissemination of the fuel in the passage 18 and in the passing compressed air, whatever the air pressure may be, and this fuel pressure may be several hundred pounds per square inch, or as may be necessary in any particular installation. The shaft 22 with its wheel unit 6 must be given initial rotation by an electric starting motor or generator or the initial flow of air may be caused by any auxiliary blower unit which may cause a flow of air through the reaction passage and the associated combustion chamber 9. In some installations it would be desirable to have an electric starting motor and in other installations it might be desirable to utilize a wind or pressure creating means of any blower type which may be temporarily utilized to create the air flow. Assuming that the shaft 22 is given initial rotation by an electric starting motor, and that the fuel pressure supply means of any type is supplying the fuel pressure, the hand valve 28 is opened to permit flow of fuel and the spark plug 20 is caused to produce sparking by an electric current passage by any means, and thereupon as air flows through passage 18 it will pick up the fuel which will, as sprayed or disseminated, commingle with it, and the air and fuel mixture of a combustible or explosive nature will enter combustion chamber 9 continuously and as it enters therein the mixture is ignited and burns explosively and with great speed and turbulence to provide thorough admixture and combustion. The combustion is thus thorough or nearly complete as the gases are discharged to the reaction chamber 11 and the reaction passage between it and wheel 6, so that the temperature of the gases entering the reaction passage is thus at its maximum and the gases will thus attain great velocity of movement and rapidly expand and create great thrust or impulse by reaction between the vanes 16 of the reaction chamber 11 and the vanes 27 of the wheel 6, as the gases pass to and discharge to the discharge conduit 17. The compression of air in the compressors formed by the compressor blades 24 and 25 may be of any magnitude, and preferably is at least as great as is possible with air blowers of the centrifugal type as they are designed or may be designed, and the passages and form of the blower conduits and blades should be such as to create the maximum pressure. This pressure may be such as is practicable in any particular installation and may in some be not more than say thirty to fifty pounds and in others may be more than a hundred pounds or several hundred pounds depending on the size of the wheel unit 6, its diameter and speed, and the pressure at which air is received by the compressor blades 24—25.

Thus air enters the air jacket space externally of the metal enclosing reaction chamber 11 under compression and relatively cool and will cool the metal of reaction chamber 11 as it passes to combustion chamber 9 and thus this metal will not overheat, and combustion will also be facilitated in combustion chamber 9. It will be noted that all the air compressed by the compressor blades 24 and the compressor blades 25 passes from the annularly formed air collection discharge conduits of the air compressors to that side where the reaction chamber 11 is located and there passes around the reaction chamber to passage 18. As the device is shown there is only a single stage of air compression but I thereby do not exclude from use any number of pre-compression stages. The air for compression might be delivered at a higher than atmospheric pressure to the air intake means by any supplementary means, and such pre-compression stages may be directly operated by shaft 22 or may be operated by any other means or powered element. It would be preferable in larger installations especially where greater economy is desired that some form of precompression for the air should be provided in order that the air compressor blades 24—25 may operate upon a higher initial pressure of air and deliver air as described for the combustion at a higher pressure. In some installations however it might be advisable to utilize no other type of blower means or other than the one stage of compression as shown, especially in installations in transport means, or in installations where the discharged gaseous products of combustion may be utilized for other purposes before their final discharge to atmosphere.

Referring now to the view in elevation on reduced scale in Figure 4, there is there shown the device, with an electric generating means, say of the motor-generator type, on or associated with shaft 22, and this motor-generator unit, designated 29, may be used for starting shaft 22 and its wheel 6 in rotation for initial movement of air through the reaction passage of the device. When so operated and fuel is delivered by the fuel pumping or reservoir means 21 the combustion process as thus initiated produces increasing speed of the turbine wheel 6 and the motor-generator until such speed is reached that effective power output is attained and the motor-generator will then operate as an electric generator. Any type of storage battery means and electric regulation means as is commonly known and used may be used in association with motor-generator unit 29, to achieve this result.

Referring now to Figure 5 there is there shown the device in a side elevation, on reduced scale as used together with an alternating current generator of any type or any current generating means 30 and a separate starting motor 31 which may also be a direct current generator, and in conjunction with the turbine unit there is shown also a supplementary gas utilization means 32 which may be a steam or other boiler generation means or water heating means or furnace heating means or turbine means which will be adapted to utilize gases of combustion discharged from the unit for generation of steam for heating or heating of water for building heating or for direct heating of air for building heating or for supplementary power production. The unit 32 is only diagrammatically shown as it is contemplated it may be any means or type of heat abstraction means which may utilize the residual heat of the exhausted gases before the discharge to atmosphere of such discharged combustion gases. It is contemplated that in many types of such combustion turbine installations of my device there will be such residual heat of combustion after the gases of combustion have passed through reaction chamber 11, as may with economy be utilized in some type of heat abstraction and heat utilization means, as the gases of combustion may leave the reaction chamber at a comparatively high temperature, because of its ability to use gases at a comparatively high initial temperature, as they perform their function of driving the turbine wheel 6. R in the drawing is refractory lining in combustion chamber 9 to increase effectiveness of combustion and insulate such portion of combustion chamber as is not passed by cooling air, but it is contemplated that the jacket space 10 may completely surround the chamber 9.

It is contemplated that the shaft 22 with its wheel 6 will rotate at a very high speed of rotation say ten thousand or more rotations per minute in all installations except very large diameter installations, and that this high speed will procure a considerable compression of the air by the air compressor blades 24—25. The turbine wheel 6 should be constructed with as little clearance between its periphery at sides of rim 26 as is permissible so as to prevent leakage and flow other than through the combustion chamber 9 and any type of leakage preventing means such as is commonly used with turbines may be used between the sides of rim 26 and the adjacent circular flange of reaction chamber 11, but such additional means need not be used in some constructions and in some uses of the device, especially as in Figure 5 where there is some additional means for economical use of residual heat of gases. And in any construction, slight leakage around the edge of the sides of rim 26 of wheel 6 is not of great importance because the proportions of the device and fuel supply in proportion may be so determined that slight leakage of air serves to provide additional air for delayed combustion such as there may be in the reaction chamber 11.

The use of the device as shown in Figure 5 where there is association of the device with other heat abstraction means is an important use of my device, as in such associations the device may provide an efficient combustion burner means which in itself provides a power output and at the same time provide a higher residual heat and pressure for use of such heat abstraction means auxiliary to it. Such heat abstraction means may in some constructions be steam generating means utilizing the residual heat of the combustion gases and providing steam for steam turbines which may be used in conjunction for power production. While I have shown particular devices and combinations of devices in the illustration of my invention, I contemplate that other detailed devices and combinations of devices may be used in the realization of my invention without departing from the spirit and intent thereof.

It is contemplated that the unit 32 of Fig. 5, which is the auxiliary heat abstraction and utilization unit, may in some installations be an auxiliary or supplementary turbine of a lower pressure type, such as the ordinary axial flow type of turbine used for gas power production, and in such case the low pressure turbine unit, which may be 32 in Fig. 5, will receive the exhaust gases through exhaust conduit 17 from the device I have shown and described and the low pressure gases will then provide additional power output in such unit 32. In such case either turbine unit, the high pressure unit such as the one I have described, or the low pressure auxiliary unit, as 32, may provide the power output for useful work conduits 7—8 should be helical or volute in form to promote efficient flow. The means I have shown is particularly contemplated for use in many installations, where such a compact and efficient unit is desirable, without other power production means, but it is also intended, especially in larger installations, for use as a unit in a power production system, where every means of heat utilization, and every means promoting efficiency, may be a part of the system.

It is contemplated that the device may be used for any purpose for production of a hot stream of combustion gases issuing through the discharge conduit 17, and especially that this means may be a part of a system utilizing exhaust gases for propulsion as in jet systems. In the claims, I use the phrase "In a combustion gas power means" or "turbine rotor for gas turbine power means" as a general usage description, and contemplate that therein may be included, any power use wherein the device may be effective or any heating use where it may be effective, and especially do I contemplate the use of the device as a means producing a stream of hot gases for jet expulsion for propulsion uses especially for airplanes.

What I claim is:

1. In a combustion gas power means, a housing, an air channel on one side of said housing for introducing air, an air channel on the other side of said housing for introducing air, a cylindrical rotor space formed in said housing between side members of said housing and said channels for introducing air, annular air collection space formed in said housing adjacent said rotor space and open thereto, a combustion space formed in said housing and to which said annular collection space delivers, a projection nozzle means delivering from said combustion space peripherally of said rotor space, a series of reversing channels formed in said housing peripherally of said rotor space and annularly in the plane of said motor space, a discharge conduit formed in said housing remote from said projection nozzle means and peripherally of said rotor space, a bearing means formed in said housing and disposed in the axis of said rotor space; a rotor journaled by the said bearing means to rotate in the plane of said rotor space and said series of reversing channels, the said rotor comprising, a one-step centrifugal compressor and a turbine bucket rim peripherally of said rotor and mounted circumferentially of said centrifugal compressor, said centrifugal compressor having a form to permit entry of air near its axis from said channels and to permit discharge of air near its periphery to said annular air collection space, said turbine bucket rim having a form and juxtaposition with said projection nozzle and said reversing channels in the plane thereof, to provide in operation for a flow of combustion gases from said combustion space in a helix-like path between the buckets of said rotor and the said reversing channels with discharge to said discharge conduit, and means for injecting fuel to said combustion space for combustion with air flowing therethrough.

2. In a combustion gas power means, a housing forming a cylindrical rotor space between side members thereof, air channel means formed in said housing and delivering into the radially inward space of said rotor space, annular air collection space including combustion space formed in said housing adjacent said rotor space and open thereto, a projection nozzle means delivering from said combustion space peripherally of said rotor space, a series of reversing channels formed in said housing peripherally of said rotor space and annularly in the plane of said rotor space, a discharge conduit formed in said housing remote from said projection nozzle means and peripherally of said rotor space, a bearing means formed in said housing and disposed in the axis of said rotor space; a rotor journaled by the said bearing means to rotate in the plane of said rotor space and said series of reversing channels, the said rotor comprising, a one-step centrifugal compressor and a turbine bucket rim peripherally of said rotor and mounted circumferentially of said centrifugal compressor, said centrifugal compressor having a form to permit entry of air near its axis from said air channel means and to permit discharge of air near its periphery to said annular air collection space, the said turbine bucket rim having a form and juxtaposition with said projection nozzle means and said reversing channels in the plane thereof, to provide in operation for a flow of combustion gases from said combustion space in a helix-like path between the buckets of said rotor and the said reversing channels with discharge to said discharge conduit, and means for injecting fuel to said combustion space for combustion with air flowing therethrough.

3. In a combustion gas power means, a housing forming a cylindrical rotor space between side members of the housing, air channel means formed in said housing and delivering into the radially inward space of said rotor space, annular air collection space including combustion space formed in said housing adjacent said rotor space and open thereto, a projection and reaction enclosure formed peripherally of said rotor space extending in the plane transversely of the axis of said rotor space and having a series of reaction channels formed serially therein and in said plane, and formed at one end to receive combustion gases from said combustion space and project said gases into said rotor space, a discharge conduit formed in said housing remote from said end of said enclosure receiving gases and able to discharge gases from said rotor space; a bearing means formed in said housing and disposed in the axis of said rotor space; a rotor journaled by said bearing means to rotate in the plane of said rotor space transversely of the axis thereof; the said rotor comprising, a one-step centrifugal compressor and a rotor rim peripherally of said rotor and mounted circumferentially of said centrifugal compressor, said centrifugal compressor having a form to receive air near its axis from said air channel means and to permit discharge of air near its periphery to said annular air collection space, the said rotor rim having a form and juxtaposition with said enclosure and having transverse blades in the plane of the rotor rim to provide in operation for enclosure of a section of the rotor rim with its blades between the receiving end and the discharge end of said enclosure and for a flow of combustion gases from said combustion space in a helix-like path between the said reaction channels and spaces between said transverse blades within said enclosure with discharge to said discharge conduit, and means for injecting fuel to said combustion space for combustion with air flowing therethrough.

4. In a combustion gas power means, a housing forming a cylindrical rotor space between side members of the housing, air channel means formed in said housing and delivering into the radially inward space of said rotor space, annular air collection space including combustion space formed in said housing adjacent said rotor space and open to said rotor space near the radially outward portion of said rotor space, a projection nozzle means delivering from said combustion space peripherally of said rotor space and in the plane of said rotor space, a series of reversing channels formed in said housing peripherally of said rotor space and annularly in the plane of said rotor space, a discharge conduit formed in said housing remote from said projection nozzle and peripherally of said rotor space, a bearing means formed in said housing and disposed in the axis of said rotor space; a rotor journaled by said bearing means to rotate in the plane of said rotor space and said series of reversing channels, the said rotor comprising, a turbine bucket rim peripherally thereof having buckets transversely thereof and an axial bearing component by which it is journaled and walls extending between said axial bearing component and said rim to form divergent rotor centrifugal compressor blades in said rotor space said divergent compressor blades having a form to permit entry of air thereto from said air channel means and to permit expulsion of air under compression to said annular collection space, the said bucket rim having a form and juxtaposition with said projection nozzle means and reversing channels in the plane thereof to provide in operation for a flow of combustion gases from said combustion space in a helix-like path in the plane of said rotor space between the buckets of said rotor and the said reversing channels with discharge to said discharge conduit, and means for injecting fuel to said combustion space for combustion with air flowing therethrough.

5. In a combustion gas power means, a housing forming a cylindrical rotor space between side members of the housing, air channel means formed in said housing and delivering into the radially inward space of said rotor space, annular air collection space including combustion space formed in said housing adjacent said rotor space and open to said rotor space near the radially outward portion of said rotor space, a projection nozzle means delivering from said combustion space peripherally of said rotor space and in the plane of said rotor space, a series of reversing channels formed in said housing peripherally of said rotor space and annularly in the plane of said rotor space, a discharge conduit formed in said housing remote from said projection nozzle and peripherally of said rotor space, a bearing means formed in each of said side members of said housing axially of said rotor space; a rotor comprising, a shaft by which said rotor is journaled by said bearing means to rotate in said rotor space in the plane of said series of reversing channels, a turbine bucket rim peripherally thereof having buckets transversely thereof, walls extending between said shaft and said rim to form divergent centrifugal compressor blades in said rotor space said divergent compressor blades having a form to permit entry of air thereto from said air channel means and to permit expulsion of air under compression to said annular collection space, the said bucket rim having a form and juxtaposition with said projection nozzle means and said reversing channels in the plane thereof to provide in operation for a flow of combustion gases from said combustion space in a helix-like path in the plane of said rotor space between the buckets of said rotor and the said reversing channels with discharge to said discharge conduit, and means for injecting fuel to said combustion space for combustion with air flowing therethrough.

ADOLPHE C. PETERSON.

REFERENCES CITED

The following references are of record in the file of this patent:

UNITED STATES PATENTS

| Number | Name | Date |
|---|---|---|
| 1,130,090 | Keelschinski | Mar. 2, 1915 |
| 1,174,439 | Pelley | Mar. 7, 1916 |
| 1,298,430 | Wondra | Mar. 25, 1919 |
| 1,702,264 | Lorenzen | Feb. 19, 1929 |
| 1,726,104 | Harris | Aug. 27, 1929 |
| 2,019,879 | Wahlstrom | Nov. 5, 1935 |
| 2,256,198 | Hahn | Sept. 16, 1941 |
| 2,272,676 | Leduc | Feb. 10, 1942 |
| 2,414,830 | McCollum | Jan. 28, 1947 |

FOREIGN PATENTS

| Number | Country | Date |
|---|---|---|
| 290,014 | Great Britain | May 10, 1928 |
| 644,829 | Germany | May 14, 1937 |